(12) United States Patent
Nishiyama (10) Patent No.: US 9,100,520 B2
(45) Date of Patent: Aug. 4, 2015

(54) DETERMINING WHETHER A SCANNED PAGE IS BLANK OR CONTAINS IMAGE DATA

(71) Applicant: CANON KABUSHIKI KAISHA, Tokyo (JP)

(72) Inventor: Kaori Nishiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/311,029

(22) Filed: Jun. 20, 2014

(65) Prior Publication Data

US 2014/0376021 A1    Dec. 25, 2014

(30) Foreign Application Priority Data

Jun. 24, 2013   (JP) .................................. 2013-131669

(51) Int. Cl.
*G06F 3/12* (2006.01)
*H04N 1/00* (2006.01)

(52) U.S. Cl.
CPC ....... *H04N 1/00442* (2013.01); *H04N 1/00411* (2013.01); *H04N 2201/0081* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2004/0205641 A1* | 10/2004 | Shimizu | 715/527 |
| 2010/0002259 A1* | 1/2010 | Maruyama et al. | 358/1.15 |
| 2011/0228351 A1* | 9/2011 | Uchida et al. | 358/474 |
| 2014/0092427 A1* | 4/2014 | Nakamura et al. | 358/1.15 |

FOREIGN PATENT DOCUMENTS

JP       2010-056803 A      3/2010

* cited by examiner

*Primary Examiner* — Eric A Rust
(74) *Attorney, Agent, or Firm* — Canon USA, Inc., IP Division (57) ABSTRACT

An apparatus includes a display unit configured to display preview images of a plurality of image data, a determining unit configured to determine whether each of the plurality of image data is a blank page, a display control unit configured to display a preview image of image data determined not to be a blank page on the display unit in a first display mode and to display a preview image of image data determined to be a blank page on the display unit in a second display mode, and a change unit configured to change the determination result and the display mode at the display unit of image data corresponding to the preview image when receiving an instruction to change the selected display mode of a preview image from the first display mode to the second display mode, or from the second display mode to the first display mode.

8 Claims, 8 Drawing Sheets

DETERMINING WHETHER A SCANNED PAGE IS BLANK OR CONTAINS IMAGE DATA

BACKGROUND

1. Field

Aspects of the present invention generally relate to an image processing apparatus, an image processing method, and a program, which judge whether image data to be processed is image data having print information or image data having no print information.

2. Description of the Related Art

There has been a technique in which, when scanning a document using an image scanning apparatus such as a digital copier or the like, the optical system is fixed, and the document is scanned while being transported by an auto document feeder (ADF), thereby acquiring image data.

Heretofore, a multifunction peripheral with an automatic document scanning apparatus performs scanning on both sides of a sheet even when documents printed on both sides of a sheet and documents printed on a single side alone of a sheet coexist. However, a blank page side of a sheet, which is the back of the document printed on just one side of the sheet is also scanned in this method. As a result, a blank sheet is read and unnecessary data processing is performed. Thus, wasteful paper consumption and wasteful power consumption occurs. Therefore, there is provided a blank page skip function in which determination is made regarding whether or not a scanned document is a blank page including no print information, and image data acquired by scanning the document determined to be a blank page is deleted.

When outputting image data acquired with this blank page skip function, image data acquired from a document determined to be a blank page is deleted. In order to preliminarily confirm whether or not blank page determination executed by this blank page skip function is accurate, a user performs confirmation of image data determined to be image data acquired from blank original before outputting the image data.

Japanese Patent Laid-Open No. 2010-056803 discloses an image processing apparatus which enables a preview display to be performed by switching between whether or not to display a preview image of image data acquired by scanning blank original, in order to perform confirmation of image data acquired by scanning a blank original.

However, in the case of the invention disclosed in Japanese Patent Laid-Open No. 2010-056803, when setting a preview image of image data acquired from a document determined to be a blank page to non-display at the time of preview, it is difficult to determine which the document has been determined to be a blank page. Also, it is difficult to confirm at which page of the overall scanned documents, the document determined to be a blank page is situated. Specifically, the user has to confirm the preview of which image data is set to non-display, by switching display/non-display of the preview image of image data acquired by scanning the document determined to be a blank page, on the screen. Also, since it is difficult to determine which the document has been determined to be a blank page, operations for modifying/correcting a determination result as to image data determined to be a blank page are complicated.

SUMMARY

It has been found to be desirable to clarify where of all of a plurality of acquired image, the data image data determined to be image data acquired from a blank original is situated, at a display controller configured display the previews of a plurality of image data at one time. Also, it has found to be desirable to enable a blank page determination result to be readily changed by performing operations on the display screen.

According to an aspect of the present disclosure, an image processing apparatus includes a display unit configured to display preview images of a plurality of image data, a determining unit configured to determine whether each of the plurality of image data is a blank page, a display control unit configured to display a preview image of image data determined not to be a blank page on the display unit in a first display mode, and to display a preview image of image data determined to be a blank page on the display unit in a second display mode, and a change unit configured to change, via the display unit, the determination result and a display mode of image data corresponding to the preview image when receiving instructions to change a selected display mode of a preview image from the first display mode to the second display mode, or from the second display mode to the first display mode.

Embodiments of the present disclosure enable where in the overall scanned documents, a document determined to be a blank page is situated to be readily recognized, and enable image data alone corresponding to necessary documents to be readily output (printing out, saving, transmission, etc.). Also, performing operations on the display screen enables a blank page determination result to be readily changed.

Further features of the present disclosure will become apparent from the following description of exemplary embodiments with reference to the attached drawings.

DESCRIPTION OF THE EMBODIMENTS

Exemplary embodiments will be described below with reference to the drawings.

First Embodiment

Figure 1:
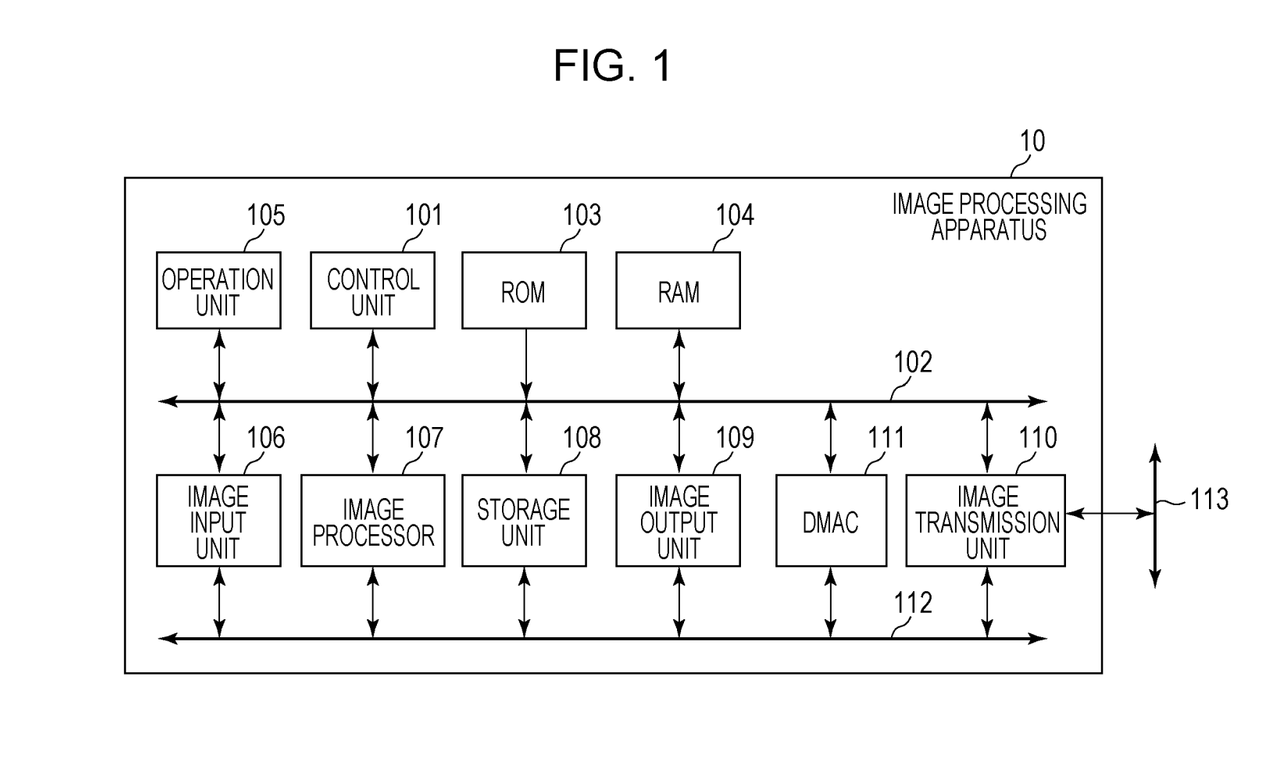
FIG. 1 is a block diagram illustrating an example of the configuration of an image processing apparatus according to a first embodiment.

FIG. 1 is a block diagram illustrating a configuration example of an image processing apparatus 10 serving as an example of a display control apparatus according to the present embodiment. FIG. 1 is a block diagram illustrating a configuration example of the image processing apparatus 10 serving as an example of the display control apparatus according to the present embodiment. A controller 101 controls the overall apparatus, and is configured including a central processing unit (CPU) and so forth. A control bus 102 connects the controller 101 and the blocks. Read only memory (ROM) 103 stores a program that the controller 101 executes. Random access memory (RAM) 104 is used for temporal storage of control data, or used as work memory under the control of the controller 101. An operation unit 105 configured to instruct operation of the apparatus performs providing of information to a user, and acceptance of instructions from the user. For example, the operation unit 105 is made up of a touch panel display. The user can perform desired processing such as printing or saving via an operation display screen such as in FIGS. 3 and 4. In the case that the operation unit 105 is a touch panel display, the controller 101 detects touch operations on the touch panel display. For example, the controller 101 detects that the touch panel display is in a state in which the touch panel display has been touched by a finger or pen or the like (hereinafter, referred to as "touch down"). Also, the controller 101 detects that the touch panel display is in a state in which the touch panel display is being touched by a finger or pen or the like (hereinafter, referred to as "touch on"). Further, the controller 101 detects that in a state in which the touch panel display is touched by a finger or pen or the like, the finger or the like moves (hereinafter, referred to as "move"). Moreover, the controller 101 detects that the finger or pen or the like which touched the touch panel display has been separated from the touch panel display (hereinafter, referred to as "touch up"). The controller 101 detects a state in which nothing touches the touch panel display (hereinafter, referred to as "touch off"). Touch operations and the position thereof (hereinafter, referred to as "position coordinates") on the touch panel display are informed to the controller 101 via the control bus 102 as touch detection signals. The controller 101 determines what kind of touch operations have been performed on the touch panel display according to the touch detection signals.

Taking move as an example, when determining, according to the touch detection signals, that the finger or pen or the like is moving on the touch panel display, the controller 101 determines that the current state is a move. The controller 101 can also determine the moving direction of the finger or the like on the touch panel according to change in the position coordinates for each vertical component and horizontal component on the touch panel.

Also, in the case of touch up being performed from touch down on the touch panel display through a certain move, these series of touch operations will be referred to drawing of a stroke. Rapidly performing the touch operations for drawing a stroke, that is, operations such as sweeping the touch panel display by the finger, will be referred to as a flick.

This flick is a touch operation in which, in a state in which the finger or the like which touches the touch panel, after the finger or the like is rapidly moved by certain distance, the finger or the like is separated from the touch panel. That is to say, a flick is a touch operation in which the touch panel surface is rapidly traced by the finger or the like.

Accordingly, in response to the touch detection signals, when subsequently detecting touch up after detecting that a move operation has been performed by equal to or longer than predetermined distance at equal to or faster than predetermined speed, the controller 101 determines that a flick has been performed.

Also, when detecting that a move operation has been performed by equal to or longer than predetermined distance at slower than predetermined speed, the controller 101 determines that a drag operation has been performed.

An image input unit 106 is a scanner, and performs scanning of image data on a document. An image processor 107 subjects the image data scanned by the image input unit 106 to image processing. A storage unit 108 stores input/output data of the image input unit 106 or image processor 107.

This storage unit 108 is configured as follows. For example, the storage unit 108 is made up of a hard disk drive (HDD), sold state drive (SSD), double data rate synchronous dynamic random access memory (DDR-SDRAM), or the like. An image output unit 109 prints out the image data processed by the image processor 107. An image transmission unit 110 transmits the image data of the document scanned by the image input unit 106, the image data processed by the image processor 107, or the image data stored in the storage unit 108. A direct memory access controller (DMAC) 111 performs data transfer control between the image input unit 106, image processor 107, storage unit 108, image output unit 109, and image transmission unit 110 based on the control of the controller 101. A bus 112 performs data transfer under the control of the DMAC 111. A communication network 113 is a communication network such as local area network (LAN) outside the apparatus, which is connected to the image transmission unit 110.

Figure 2:
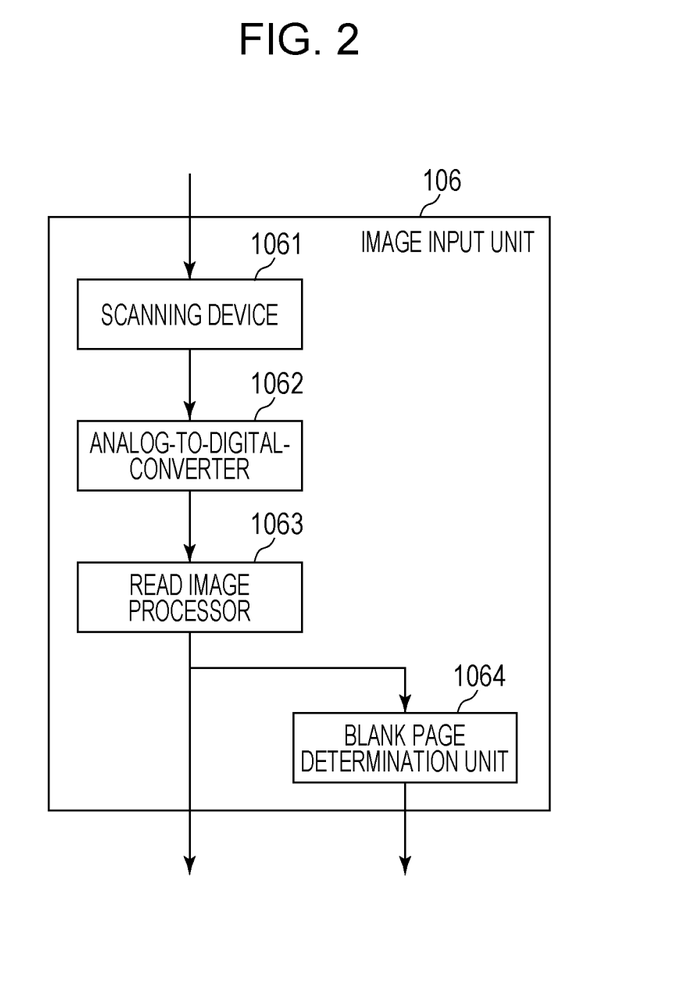
FIG. 2 is a block diagram illustrating an example of the inner configuration of an image input unit.

The configuration of the image input unit 106 will be described with reference to FIG. 2. FIG. 2 is a diagram illustrating the inner configuration of the image input unit 106. In FIG. 2, reference numeral 1061 denotes a scanning device, which is made up of a charge-coupled device (CCD), a complementary metal-oxide semiconductor (CMOS), or a contact image sensor (CIS). A document is scanned via the scanning device 1061, and analog image data acquired by scanning the document is output to the subsequent processor. Reference numeral 1062 denotes an analog-to-digital converter, which converts the scanned data by the scanning device 1061 into digital data. Reference numeral 1063 denotes a read image processor, which performs processing such as shading correction in which the levels of a highlight portion (white) and dark portion (black) of the scanned image data are synchronized, modulation transfer function (MTF) correction, high-frequency suppression processing, or the like. Reference numeral 1064 denotes a blank page determination unit, which references the image data processed by the read image processor 1063 to determine whether or not the read image data is a blank page.

Blank Page Determination Method

A blank page determination method by the blank page determination unit 1064 determines a blank page using a frequency distribution of the luminance values of image data processed by the read image processor 1063, for example. The blank page determination unit 1064 generates a frequency distribution of read image data acquired by scanning a sheet of the document based on the image data that the read image processor 1063 outputs. Next, a mean value and a variance value are obtained from the generated frequency distribution. The reason why the variance value is obtained is because of taking advantage of the following feature. Specifically, in the case that significant information (information other than a blank page) is included in the read image data of the document, the calculated variance value becomes great.

Though the method using a frequency distribution has been described as the blank page determination method in the present embodiment, the method is not restricted to this. For example, an arrangement may be made in which a processor configured to detect the edges of the read image data is provided, pixels determined to be the edge are counted, and blank page determination is performed according to the count value thereof. Also, blank page determination may be made by combining the frequency distribution, variance value, and the number edges.

Also, here, the term "blank page" means a document determined to have no print information (e.g., contents). If there is no print information, colored documents such as colored paper and recycled paper are also handled as blank pages. That is to say, blank page determination is determination of presence/absence of contents printed on the document. Also, image data at the time of scanning these, and image data of show-through (text or the like on the reverse face showing through) alone at the time of scanning will also be referred to as a blank page below. On the other hand, a document including a small amount of text, thin text printed by halftone dots, or the like is not a blank page. Image data scanned from a sheet including handwriting or print information printed by a printer will be referred to as contents data. The image input unit 106 outputs the image data after the read image data is subjected to processing by the read image processor 1063, and the blank page determination result by the blank page determination unit 1064.

The output data and blank page determination result of the image input unit 106 are transferred to the storage unit 108 by the DMAC 111 based on the control of the controller 101. The storage unit 108 temporarily stores the image data and blank page determination result transferred via the DMAC 111.

The image processor 107 generates image data for preview display based on the image data and blank page determination result held at the storage unit 108.

Figure 3:
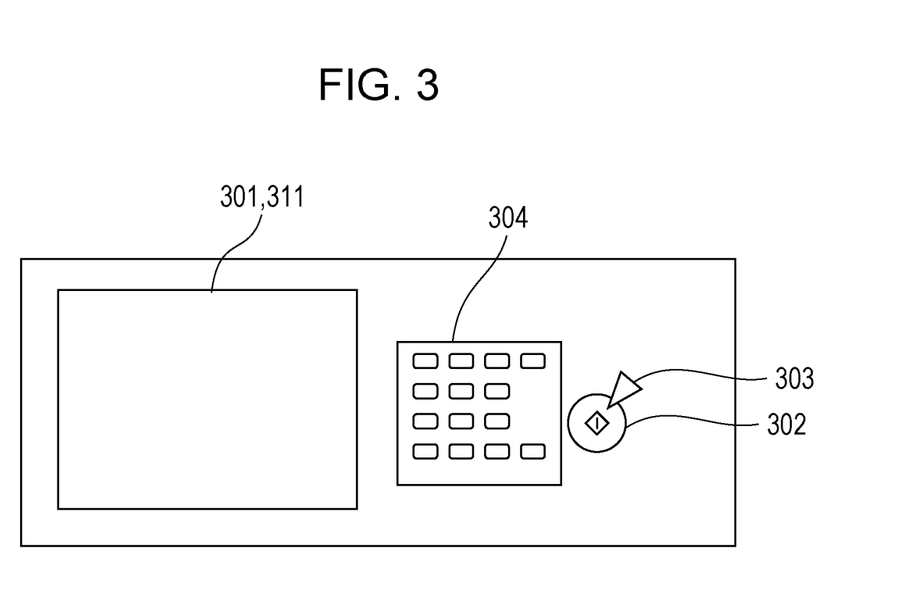
FIG. 3 is a plan view illustrating an example of the configuration of an operation unit.

FIG. 3 is a plan view for describing an example of the configuration of the operation unit 105 illustrated in FIG. 1.

In FIG. 3, an image display unit 301 makes up the touch panel display along with a later-described contact detector 311 made up of a liquid crystal panel or organic EL panel or the like. A start key 302 is used at the time of performing a start instruction for scanning operation of a document, or the like. A stop key 303 is used at the time of performing an instruction for stopping an operation currently running. A numeric keypad 304 is made up of a button group of numbers and characters, and is used for instructing setting of the number of copies, or screen switching of the image display unit 301.

The contact detector 311 is disposed on the image display unit 301, whereby operations such as touch down, touch on, move, touch up, touch off, flick, drop, and so forth can be detected.

Preview Screen

Figure 4A:
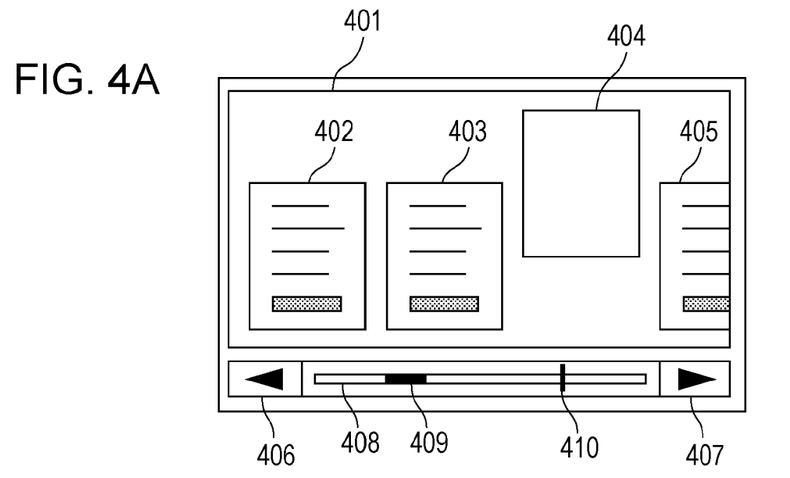
FIGS. 4A to 4C are diagrams illustrating an example of a screen displayed on an image display unit.

FIG. 4A is a diagram illustrating an example of a preview screen displayed on the image display unit 301. FIG. 4A is an example of preview display in a state in which a blank page determination function is on. In the case that the blank page determination function is off, normal preview display is performed. In the case of normal preview display, the preview image of any image data is displayed on the same display position.

A preview image display portion 401 is an area for displaying image data for preview display generated at the image processor 107. Flicking this area enables the previous preview image or the next preview image to be displayed. Preview images 402, 403, 404, and 405 are generated images for preview display. The preview image 404 represents the preview image of image data determined to be a blank page by the blank page determination unit 1064. The preview image of the image data determined to be a blank page is displayed (second display mode) in a position (second position) shifted in the vertical direction from the position (first position) of the preview image displayed in a first display mode as illustrated in FIG. 4A, which differs from a display mode (first display mode) of the preview image of image data not determined to be a blank page. The display mode (first display mode) of the preview image of image data not determined to be a blank page is the same display mode as a case where the blank page determination function is off.

Also, in the case that preview images are arrayed in the vertical direction at the preview image display portion 401, which differs from FIG. 4A, the preview image of image data determined to be a blank page is displayed (second display mode) in a position (second display position) shifted in the horizontal direction from the position (first position) of a preview image displayed in the first display mode.

Thus, the preview image of image data not determined to be a blank page is displayed in the first display mode, and the preview image of image data determined to be a blank page is displayed in the second display mode. In other words, the arrangement is not restricted to the example illustrated in FIGS. 4A and 4B, and the preview image of image data not determined to be a blank page and the preview image of image data determined to be a blank page have to be displayed in an identifiable manner.

Also, display to the effect that this image data that will be removed may be made on the preview image of image data determined to be a blank page at the display unit at this time. A button 406 is a button for displaying the previous preview image. A button 407 is a button for displaying the next preview image. A slider 409 located on a scroll bar 408 represents at which position of the overall acquired image data, the image data indicated by the preview image displayed on the preview image display portion 401 is situated. Performing touch on and move operations on the slider 409 also enables the preview image display to be switched. A blank page determination image position 410 represents the position of image data determined to be a blank page. When setting the scrollbar 408 to the position of the blank page determination image position 410 by a flick operation, button operation, and touch on/move operation, confirmation of the next image data determined to be a blank page can be performed. Though the present embodiment allows the user to perform preview page turning by a flick operation, button operation, and touch on/move operation, a use operation method may be selectable from one of a flick operation alone, button operation alone, and touch on/move operation alone.

Figure 8:
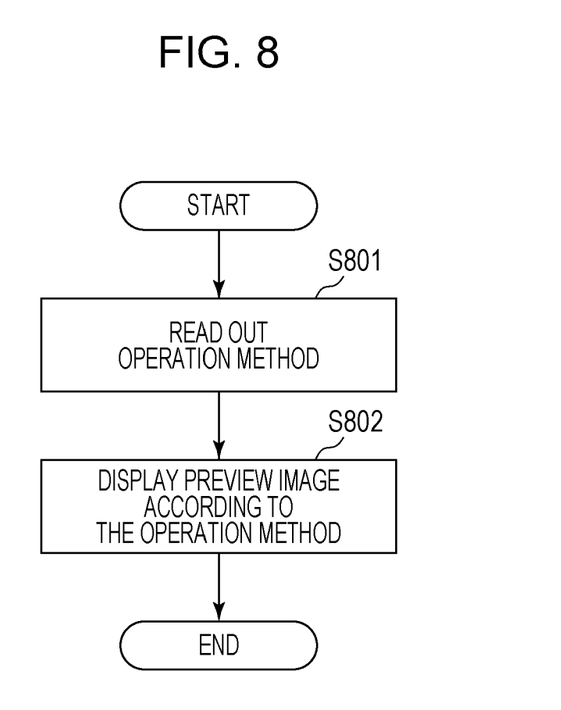
FIG. 8 is a flowchart illustrating the flow of processing for defining an operation method.

The processing for changing the display mode according to the operation method will be described with reference to the flowchart in FIG. 8. Note that the operation in each step in the present flowchart is realized by the controller 101 loading a program stored in the ROM 103 to the RAM 104 and executing this.

First, in S801 the controller 101 reads out the definition of the operation method from the storage unit 108 or the like. The operation method represents a flick operation alone, button operation alone, touch on/move operation alone, or a combination thereof, and so forth. The input method may be specified at the time of use of a device, or may be specified by each operation. Also, the definition of the operation method may be linked to each user, and may be specified beforehand. Next, in S802 the controller 101 calls up the definition contents of the operation method, and displays a preview screen in response to the specified input method. FIG. 4C represents an example of the display mode in the case of enabling the button operation alone, whereby the operation can be performed by the button operation alone. That is to say, an instruction is performed by operating a button displayed on the screen.

Next, description will be made regarding a processing procedure to display image data for preview display generated at the image processor 107 on the preview image display portion 401, with reference to the flowchart in FIG. 5. Note that the operation in each step in the present flowchart is realized by the controller 101 loading a program stored in the ROM 103 to the RAM 104 and executing this.

First, in S501, at the time of displaying the screen in FIG. 4A, the controller 101 generates image data for preview display based on the image data and blank page determination result held at the storage unit 108 by the image processor 107. Next, in S502 the controller 101 determines whether or not the first image data of the image data for preview display has been determined to be a blank page. In the case of determining that the first image data is image data not determined to be a blank page in S502, in S503 the controller 101 displays the preview image data in the normal display mode.

In the case that determination is made that the first image data is image data of a blank page in S502, in S504 the controller 101 changes the display mode of the preview image to the display mode different from the display mode in S503, proceeds to S503, and displays the preview image. Next, the controller 101 proceeds to S506, and determines whether or not there is a next preview image to be processed. In the case that there is a next image to be processed, the controller 101 determines whether or not the next image for preview display is image data determined to be a blank page (S502). In the case that there is no next image, the controller 101 ends the processing.

Thus, the display mode of the preview image of image data determined to be a blank page is changed from the display mode of the preview image of image data not determined to be a blank page, thereby facilitating confirmation regarding which image data has been determined to be a blank page of all image data, and also facilitating confirmation of the position of image data determined to be a blank page (blank page document position) in the overall acquired image data. Also, displaying the preview image position of image data determined to be a blank page above the scroll bar 408 facilitates confirmation of the next image determined to be a blank page.

Figure 6:
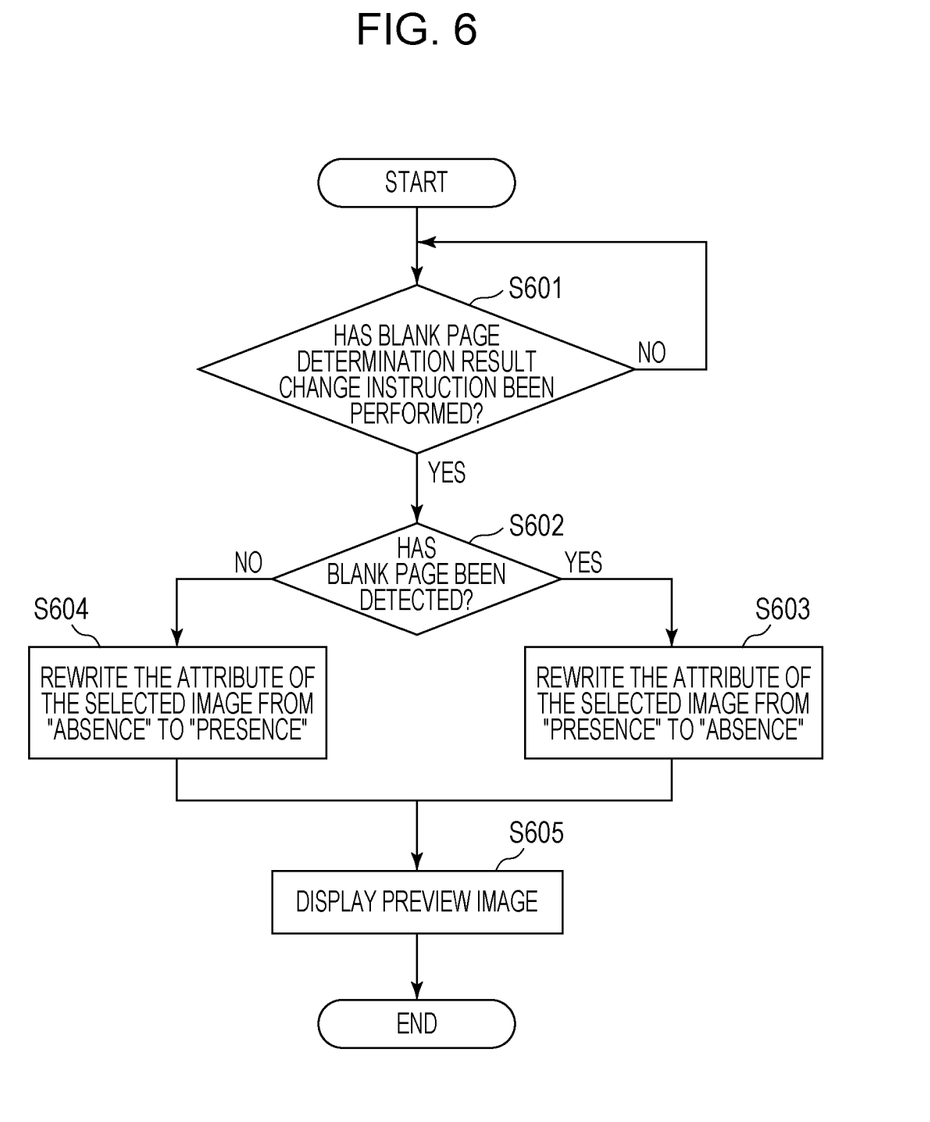
FIG. 6 is a flowchart illustrating the flow of display control processing according to the first embodiment.

Next, editing of image data for preview display will be described with reference to the flowchart in FIG. 6. Note that the operation in each step in the present flowchart is realized by the controller 101 loading a program stored in the ROM 103 to the RAM 104 and executing this. First, in S601 the controller 101 determines whether or not there has been a blank page determination result change instruction. Specifically, when describing FIG. 4A as an example, the controller 101 determines whether or not touch on as to the preview image 404 of image data determined to be a blank page has been detected by the contact detector 311.

Also, the controller 101 determines whether or not a flick operation has been detected by a move operation in the display start position direction (backward direction) as to the preview image 404 of image data not determined to be a blank page.

Also, the controller 101 determines whether or not touch on as to one of the preview images 402, 403, and 405 of image data not determined to be a blank page has been detected.

Also, the controller 101 determines whether or not a flick operation has been detected by a move operation in the display start position direction (upward direction) as to one of the preview images 402, 403, and 405 of the image data not determined to be a blank page has been detected.

In the case that there has been such a blank page determination result change, in S602 the controller 101 determines whether the blank page determination result of the image data corresponding to the selected preview image is YES or NO in blank page determination. In the case of determining that the image data corresponding to the selected preview image is image data determined to be a blank page, the controller 101 proceeds to S603. Next, the controller 101 rewrites the blank page determination result held at the storage unit 108 corresponding to the selected image data from YES to NO in blank page determination.

In the case of determining that the image data corresponding to the selected preview image is image data not determined to be a blank page, the controller 101 proceeds to S6044. Next, the controller 101 rewrites the blank page determination result held at the storage unit 108 corresponding to the selected image data from NO to YES in blank page determination.

Figure 5:
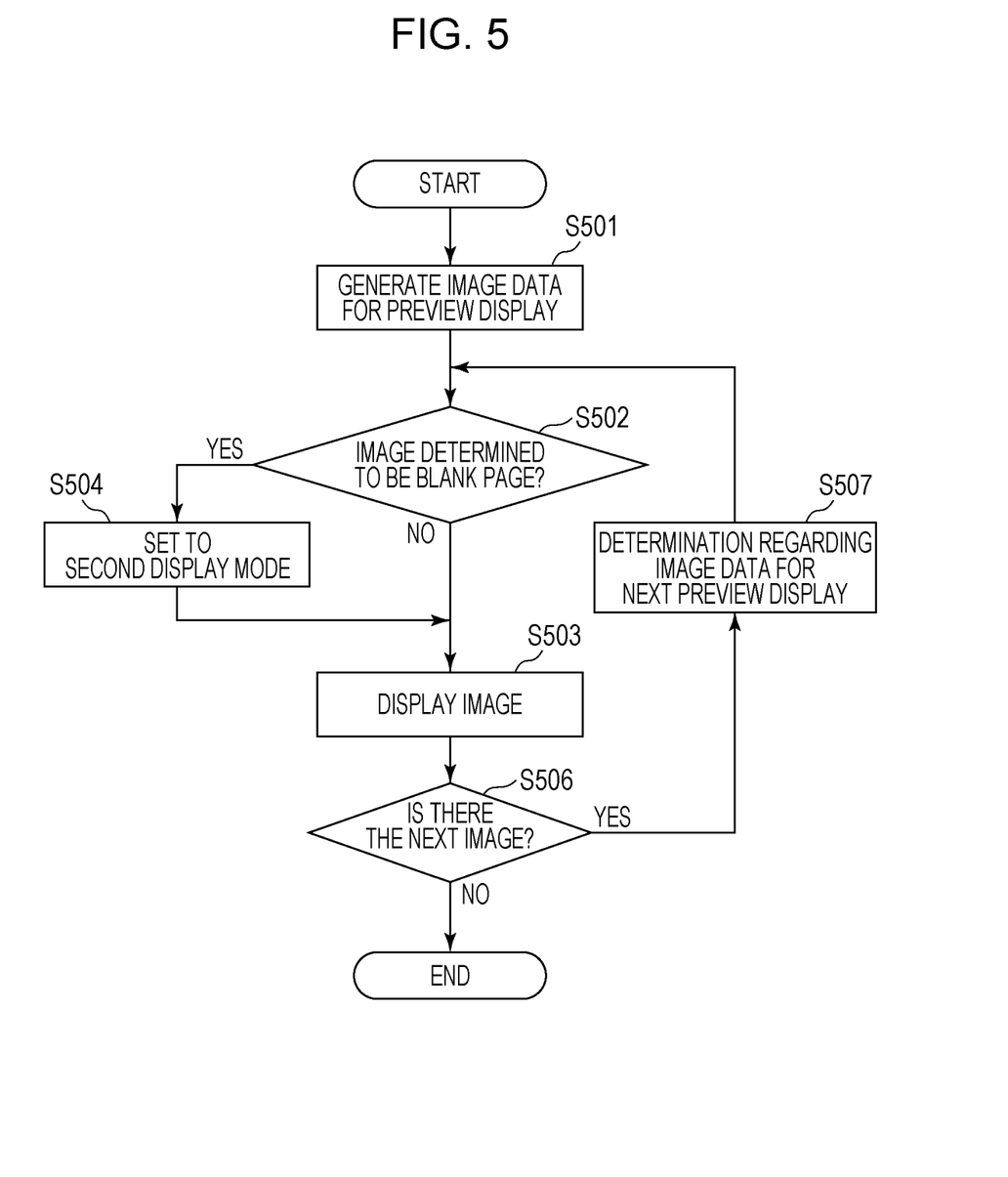
FIG. 5 is a flowchart illustrating the flow of display control processing according to the first embodiment.

Next, the controller 101 performs redrawing of the preview image display portion based on the processing illustrated in the flowchart in FIG. 5. At this time, there may be displayed a confirmation window regarding whether to perform the same processing on the same image data determined to be a blank page other than the preview image 404 of the image data determined to be a blank page.

Figure 4B:
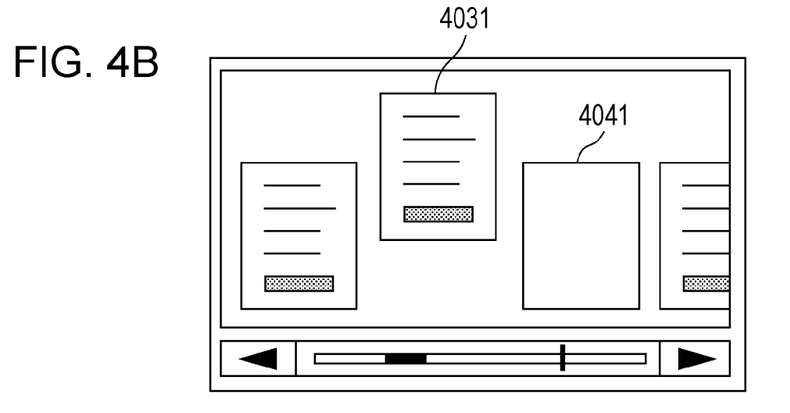
Figure 4C:
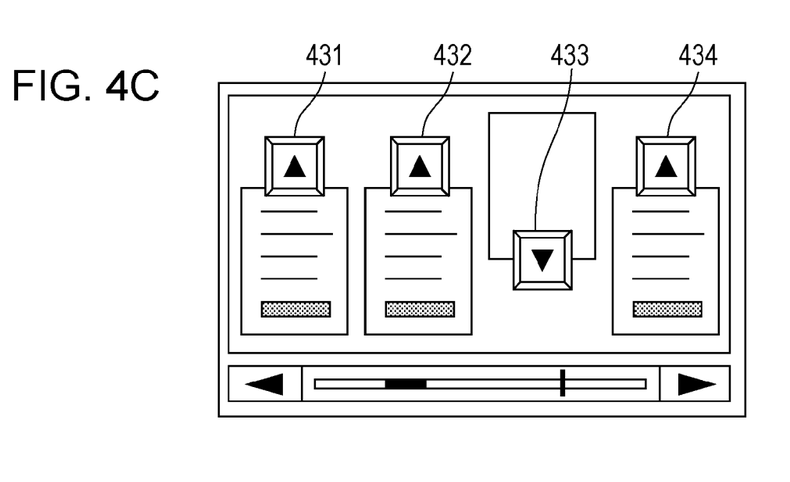

FIG. 4B represents an example of the display screen redrawn by such operations. Since the determination result of the image data corresponding to the preview image 404 has been changed to NO in blank page determination, a preview image 4041 is displayed from the normal previous image display start position. Since the determination result of the image data corresponding to the preview image 403 has been changed to YES in blank page determination, a preview image 4031 is displayed from the preview image display start position of the image data determined to be a blank page. That is to say, the preview image 404 which has been in the second display mode is displayed in the second display mode as illustrated in the preview image 4041.

When detecting pressing of the start key 302, the controller 101 transfers the image data held at the storage unit 108 except for image data determined to be a blank page to the image processor 107 using the DMAC 111, and performs output processing such as printing or transmission.

Though description has been made using the touch on, move, and flick operations, the operation method is not restricted to this. FIG. 4C is an example of operations according to buttons operations, and buttons 431, 432, 433, and 434 displayed on the preview image represent buttons for instructing blank page determination result change.

Thus, according to such simple operations, the determination result as to image data determined to be a blank page can be changed, so as to be image data to be output, or the determination result as to the image data to be output can be changed so as to be image data which is not to be output. Thus, operability accompanied with editing of acquired image data is improved.

Second Embodiment

When detecting a flick at the preview image display portion 401 in FIG. 4A, the controller 101 switches the preview image in accordance with the speed of the flick, and displays the image data for preview display generated at the image processor 107.

In the case of having performed a flick operation at high speed, even when displaying the image data determined to be a blank page by shifting the display position thereof, or even when displaying the position of the image determined to be a blank page using the scroll bar 408 indicating the position of a blank page image, the user may miss the display. As control for suppressing this, description will be made regarding a processing procedure for displaying image data for preview display generated at the image processor 107 on the preview image display portion 401, with reference to the flowchart in FIG. 7.

Note that the operation in each step in the present flowchart is realized by the controller 101 loading a program stored in the ROM 103 to the RAM 104 and executing this.

Figure 7:
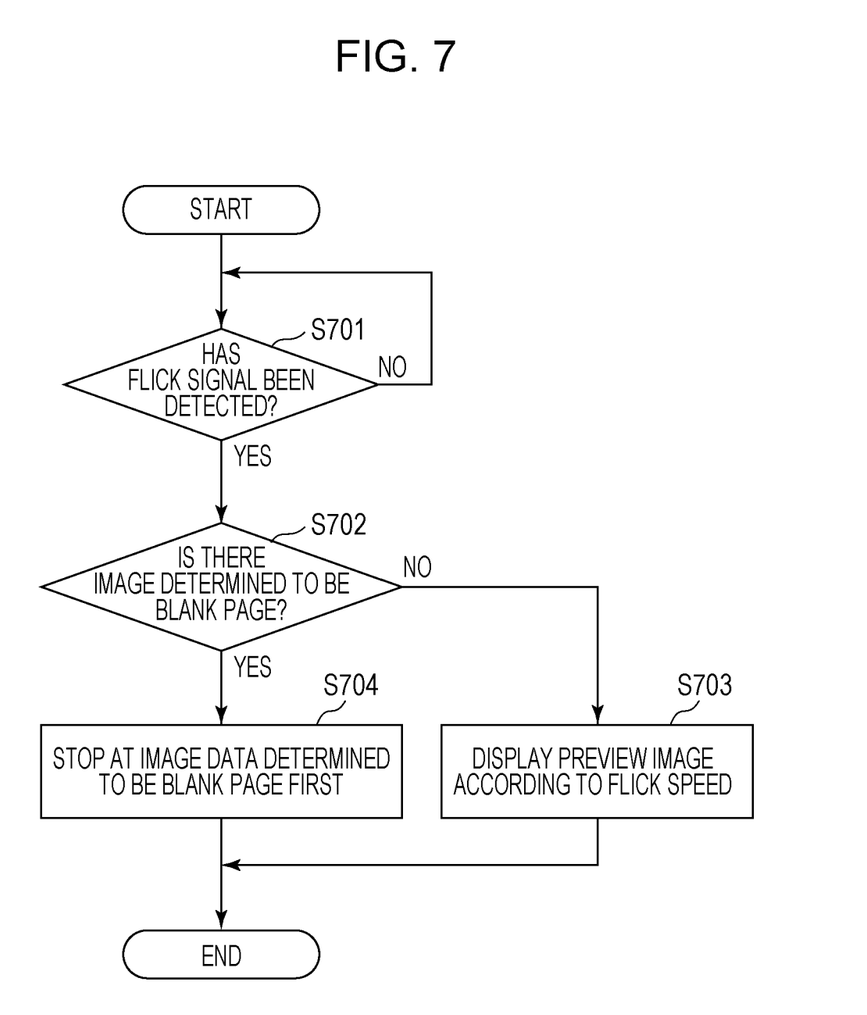
FIG. 7 is a flowchart illustrating the flow of display control processing according to a second embodiment.

First, in S701 the controller 101 detects whether or not a flick has been performed in the region of the preview image display portion 401 in FIG. 4A, using the contact detector 311. When detecting that a flick has been performed, the controller 101 proceeds to S702. In S702, the controller 101 determines whether or not there is an image determined to be a blank page in the data of the multiple preview images to be displayed. In the case of determining that there is no image determined to be a blank page in the data of the multiple preview images to be displayed, the controller 101 proceeds to S703. In S703, the controller 101 performs display of the preview images according to flicking speed. In the case of determining that image data determined to be a blank page is included in S702, the controller 101 proceeds to S704, where the controller 101 displays a preview image stopped at image data determined to be a blank page first.

Thus, according to stopping preview at a preview image determined to be a blank page, even in the case of having changed the preview image to be displayed by performing a flick operation at high speed, the image determined to be a blank page can be confirmed in a sure manner. Though description has been made based on flicking in the present embodiment, additional embodiments may be implemented by preview display performing operations using continuous page turning by long pressing of a button, or the like.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-131669, filed Jun. 24, 2013, which is hereby incorporated by reference herein in its entirety.

What is claimed is:

1. An image processing apparatus comprising:
    a display unit configured to display preview images of a plurality of image data;
    a determining unit configured to determine whether each of the plurality of image data is a blank page;
    a display control unit configured to display a preview image of image data determined not to be a blank page on the display unit in a first display mode, and to display a preview image of image data determined to be a blank page on the display unit in a second display mode; and
    a change unit configured to: (i) when an instruction for changing a display mode of a selected preview image from the first display mode to the second display mode is executed on the display unit, change the display mode on the display unit from the first display mode to the second display mode and change a determination result of image data corresponding to the preview image to a blank page; and (ii) when an instruction for changing a display mode of a selected preview image from the second display mode to the first display mode is executed on the display unit, change the display mode on the display unit from the second display mode to the first display mode and change a determination result of image data corresponding to the preview image to a non-blank page.

2. The image processing apparatus according to claim 1, wherein the preview image is displayed on the display unit by the display control unit according to the determination result changed by the change unit.

3. The image processing apparatus according to claim 1, wherein the instruction for changing the display mode of the preview image is executed by performing a flick operation on the display unit.

4. The image processing apparatus according to claim 1, wherein the second display mode is a display mode in which, in a case that the preview images of the plurality of image data are arrayed in a horizontal direction on the display unit, the preview images are displayed in a position shifted in a vertical direction against the first display mode, and
    wherein the second display mode is a display mode in which, in a case that the preview images of the plurality of image data are arrayed in a vertical direction on the display unit, the preview images are displayed in a position shifted in a horizontal direction against the first display mode.

5. The image processing apparatus according to claim 1, further comprising:
    a switching unit configured to switch the plurality of preview images displayed on the display unit to a preview image of image data acquired prior to the plurality of preview images or a preview image of image data acquired after the plurality of preview images,
    wherein in a case that there is a preview image of image data determined not to include print information in a plurality of preview images to be displayed on the display unit at the time of the plurality of preview images displayed on the display unit being switched by the switching unit, switching of the preview images by the switching unit is stopped, and the preview image of image data determined not to include the print information is displayed.

6. The image processing apparatus according to claim 1, further comprising:
    a defining unit configured to define an operation method corresponding to a touch panel of the display unit,
    wherein instructions are performed on the touch panel of the display unit using the defined operation method.

7. A control method for an image processing apparatus including a display unit configured to display preview images of a plurality of image data, the method comprising:
    determining whether each of the plurality of image data is a blank page;
    displaying a preview image of image data determined not to be a blank page on the display unit in a first display mode, and to display a preview image of image data determined to be a blank page on the display unit in a second display mode; and when an instruction for changing a display mode of a selected preview image from the first display mode to the second display mode is executed on the display unit, changing the display mode on the display unit from the first display mode to the second display mode and changing a determination result of image data corresponding to the preview image to a blank page, and, when an instruction for changing a display mode of a selected preview image from the second display mode to the first display mode is executed on the display unit, changing the display mode on the display unit from the second display mode to the first display mode and changing a determination result of image data corresponding to the preview image to a non-blank page.

8. A non-transitory computer-readable storage medium storing computer executable instructions that cause a computer to execute a method for controlling an image processing apparatus, the method comprising:

determining whether each of the plurality of image data is a blank page;

displaying a preview image of image data determined not to be a blank page on a display unit of the image processing apparatus in a first display mode, and to display a preview image of image data determined to be a blank page on the display unit in a second display mode; and when an instruction for changing a display mode of a selected preview image from the first display mode to the second display mode is executed on the display unit, changing the display mode on the display unit from the first display mode to the second display mode and changing a determination result of image data corresponding to the preview image to a blank page, and, when an instruction for changing a display mode of a selected preview image from the second display mode to the first display mode is executed on the display unit, changing the display mode on the display unit from the second display mode to the first display mode and changing a determination result of image data corresponding to the preview image to a non-blank page.

* * * * *